Patented Feb. 21, 1933

1,898,750

UNITED STATES PATENT OFFICE

ROBERT FRASER THOMSON AND WILLIAM WYNDHAM TATUM, OF GRANGEMOUTH, SCOTLAND, ASSIGNORS TO IMPERIAL CHEMICAL INDUSTRIES, LIMITED, A CORPORATION OF GREAT BRITAIN

MANUFACTURE OF ANTHRAQUINONE DERIVATIVES

No Drawing. Application filed July 22, 1931, Serial No. 552,543, and in Great Britain July 28, 1930.

This invention relates to the production of amino-arylaminoanthraquinones, i. e. arylaminoanthraquinones having an amino group in the aryl nucleus, and to the production of bodies which are derivatives of these. It relates especially to the production of such bodies from halogenated aminoanthraquinone.

p-Phenylenediamine and other arylamines containing more than one amino group do not, in general, condense with anthraquinone derivatives, especially halogen anthraquinone derivatives, with the same ease as do the corresponding mono-arylamines. There is difficulty in getting good yields and the products are contaminated with impurities. These disadvantages are probably due to the greater reactivity of the di- and polyamines and their tendency to take part in undesirable side reactions.

We have now found that in the condensation of amino-halogen-anthraquinones and the alkylamino-halogen-anthraquinones and their derivatives with p-phenylenediamine and the like as defined above, the amine or other organic liquid being used as medium, condensation is facilitated and better yields and purer products obtained by acylating the amino or alkylamino group in the anthraquinone nucleus prior to condensation, or by carrying out the condensation in a high boiling tertiary base such as, for example, high boiling pyridine bases.

By our process we can obtain bodies which are suitable either as intermediates or as dyestuffs. They are particularly suitable as dyestuffs for acetate silk and include substances giving desirable green shades on that material. They are also suitable as intermediate for acid colours for wool, particularly for level-dyeing acid colours. Some of our products are new.

In carrying out the condensation, acid absorbing agents are generally used with or without a copper catalyst such as copper acetate.

The following examples, in which parts are by weight, illustrate but do not limit the invention.

*Example 1*

This is an example of the production of 1-methyl-amino-4-p-aminophenylaminoanthraquinone from 4-bromo-1-methylaminoanthraquinone. This latter body is first acetylated by known methods, and then 100 parts of the acetylated body are mixed with 150 parts of pure pyridine, 60 parts of paraphenylene diamine, 35 parts of potassium acetate and 20 parts of potassium carbonate. The whole is heated for 10 hours at 110–115° C. It is then allowed to cool, filtered, washed first with alcohol and then with water. Dark violet crystals are obtained which dissolve in concentrated sulphuric acid with a green colour, the solution becoming red on diluting and purple on pouring into water.

From this product, which is 1-acetylmethylamino-4-p-aminoanilinoanthraquinone the acetyl group is removed by hydrolysis as follows.

100 parts of the acetyl derivative are stirred into 700 parts of 94% sulphuric acid and heated at 60–65° C. for 1 hour. The whole is then poured on to ice, filtered and washed. It forms a blue paste dyeing acetate silk in bright bluish green shades.

*Example 2*

This is somewhat similar to Example 1 except that the starting material is 4-bromo-5-nitro-1-methylamino-anthraquinone (obtained by bromination of 5-nitro-1-methylaminoanthraquinone). This is acetylated and then 6 parts of the derivative are added to 4 parts of p-phenylenediamine with 3 parts of potassium acetate, 2 parts of potassium carbonate and 15 parts of pyridine. The whole is then heated with stirring at 90–100° C. The product is isolated and dried and hydrolyzed by heating in sulphuric acid at 90° C. The resulting nitro body or the corresponding amino body obtained by boiling with sodium sulphide dyes acetate silk in green blue shades.

*Example 3*

This is similar to the two previous examples except that the amino derivative is benzoylated instead of acetylated.

36 parts of 5-chloro-1-benzoylaminoanthraquinone, 15 parts of p-phenylenediamine, 10 parts of potassium acetate, 7 parts of potassium carbonate, 60 parts of pyridine and ½ part of copper acetate are heated together for 17 hours at 120° C. The product is then isolated in a similar way to the previous examples.

It forms a dark powder dissolving in concentrated sulphuric acid with an orange brown colour which becomes blue on the addition of formaldehyde or red on diluting and violet brown on neutralizing.

The benzoyl group is removed by heating for 1 hour in 6 parts of 94% sulphuric acid at about 75° C. The colour of the sulphuric acid solution changes to olive and becomes purple on the addition of water and bluish red on further dilution.

The product dyes acetate silk a rich maroon colour.

*Example 4*

This is an example of the use of a high boiling tertiary base. 100 parts of 4-bromo-1-methylaminoanthraquinone, 100 parts of p-phenylenediamine, 40 parts of potassium acetate, 25 parts of potassium carbonate, and 400 parts of technical grade pyridine having a boiling range up to about 140° C., contained foreign matters, presumably including alkyl pyridines, accounting for the given distillation range, are heated at 140° C. for 2 hours. The product is then cooled, filtered, washed, dried and pasted from sulphuric acid.

It dyes acetate silk in bluish green shades and its constitution corresponds with that of 1-methylamino-4-aminoanilinoanthraquinone.

We claim:

1. Process for the manufacture of arylaminoanthraquinones containing an amino substituent group in the aryl nucleus and also in the anthraquinone nucleus, which comprises the condensation of a halogenoted N-acylated aminoanthraquinone body having the probable formula

wherein R represents an anthraquinone nucleus, $R_1$ represents hydrogen or an alkyl group, $R_2$ represents an halogen and X represents an acyl group, with an aromatic polyamine containing at least two amino groups having replaceable hydrogen.

2. Process according to claim 1 in which the condensation is effected in the presence of an acid-absorbing agent.

3. Process according to claim 1 in which the condensation is effected in the presence of a medium comprising a high-boiling tertiary base.

4. Process according to claim 1 in which the condensation is effected in the presence of a copper catalyst.

5. Process for the manufacture of arylaminoanthraquinones containing an amino substituent group in the aryl nucleus and also in the anthraquinone nucleus, which comprises the steps of acylating a halogenoanthraquinone containing as substituent an amino group having replaceable hydrogen, condensing the product with an aromatic polyamine containing at least two amino groups having replaceable hydrogen, and subsequently removing the acyl group by hydrolysis.

6. Process for the manufacture of 4-p-aminoanilino-1-methylaminoanthraquinone comprising the condensation of 4-halogeno-1-acetylmethylaminoanthraquinone with p-phenylenediamine followed by removal of the acetyl group by hydrolysis.

7. Process according to claim 6 in which 4-bromo-1-acetylmethylaminoanthraquinone is used as starting material.

8. Process according to claim 6 in which the condensation is effected in the presence of on acid-absorbing agent.

9. Process according to claim 6 in which the condensation is effected in the presence of a medium comprising a high-boiling tertiary base.

10. Process according to claim 6 in which the condensation is effected in the presence of a copper catalyst.

11. As new products, anthraquinone compounds useful as dyestuff intermediates and dyes, said anthraquinone compounds having the formula

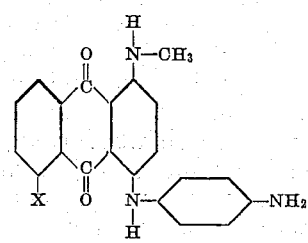

wherein X represents an amino or nitro group.

12. As a new product, 1-methylamino-4-anilinoamino-5-nitroanthraquinone, said anthraquinone compound having the probable formula

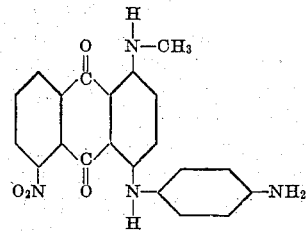

and being useful as a dyestuff intermediate.

13. As a new product, 1-methylamino-4-anilinoamino-5-aminoanthraquinone, said anthraquinone compound having the probable formula
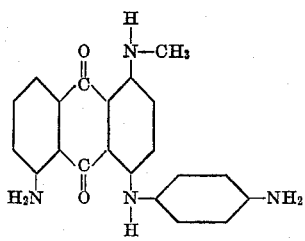
and dyeing acetate silk in blue green shades.
In testimony whereof we affix our signatures.
ROBERT FRASER THOMSON.
WILLIAM WYNDHAM TATUM.